July 29, 1958 A. GOLDBERG ET AL 2,845,479

TELEVISION GAMMA CONTROL APPARATUS

Filed Sept. 23, 1954

INVENTORS.
ABRAHAM GOLDBERG
CHESTER SCHELP
BY Campbell, Brumbaugh, Free & Graves
ATTORNEYS United States Patent Office 2,845,479
Patented July 29, 1958

2,845,479

TELEVISION GAMMA CONTROL APPARATUS

Abraham Goldberg, Teaneck, and Chester Schelp, Westbury, N. J., assignors to Columbia Broadcasting System, Inc., New York, N. Y., a corporation of New York Application September 23, 1954, Serial No. 457,981

4 Claims. (Cl. 178—5.2)

The present invention relates to television, and, more particularly, to novel and improved methods and means for producing a substantially distortionless overall transfer characteristic for a television system.

The overall transfer characteristic of a television system may be defined as the relation between the values of brightness in portions of the televised object and the values of brightness in the corresponding portions of the reproduced image. It is, of course, a composite of the separate transfer characteristics (i. e., the relation between input signal and output signal in each case) of the components comprising the system. Conventionally, these transfer characteristics are plotted on log-log coordinates and the slope or gradient of the plot obtained (usually called "gamma") is a measure of the brightness distortion introduced by the system or component. For complete freedom of brightness distortion in an overall system, the gamma of its transfer characteristic (i. e., the relation between brightness in a portion of the original object and the brightness of the corresponding portion of the image reproduced) should be unity and this is usually an objective in television system design.

Television camera tubes such as iconoscopes and image orthicons have transfer characteristics of gamma less than unity, whereas for television picture tubes or kinescopes the gamma of the transfer characteristic is usually greater than unity. Hence, the one in effect tends to compensate for the other and the product of the gammas of the transfer characteristics may approach unity. Accordingly, in a conventional television system having a camera tube and a picture tube at opposite terminals thereof, unity gamma for the overall transfer characteristic may be achieved by providing conventional gamma control means, if necessary, to compensate for any nonuniform brightness distortion that may be introduced by the system components interposed between the camera tube and the picture tube. Such gamma control means usually comprises an additional transducer having a transfer characteristic curve of the proper curvature to compensate for the distortion which it is desired to eliminate.

In more recent developments in the color television art, tandem video channels are utilized in which the electrical video signal produced by a black and white camera tube viewing a color separation of an object to be televised is converted at an intermediate point in the system into a light picture, which is scanned by a second camera tube. The second camera tube then produces a video signal which is combined with other video signals and transmitted to receiver means including a color picture tube. Video channels of this type form part of the system shown in the copending U. S. application Serial No. 375,219, for "Color Television," filed August 19, 1953, by Peter C. Goldmark, wherein a camera tube scans three color separations of an object in a field sequential manner to produce corresponding images upon three kinescopes. The kinescope images are scanned, respectively, by three camera tubes in such fashion as to produce three instantaneous color video signals which are combined for transmission to receiver means including a color picture tube.

In systems of this type, it is common practice to operate the second camera tube in each channel on the linear portion of its transfer characteristic. When this is done, the tube has a gamma equal to one, i. e., it does not introduce distortion into the system. Further, the transfer characteristic of the terminal color picture tube has a gamma that is considerably greater than the gamma for the conventional black and white picture tube. Therefore, instead of the low-gradient ($\gamma<1$) transfer characteristics of the camera tubes being substantially compensated by the high-gradient ($\gamma>1$) transfer characteristics of the picture tubes to produce an overall transfer characteristic with $\gamma=1$, it is found that the overall characteristic has a gamma greater than one.

It is an object of the invention, accordingly, to provide a novel method and means for compensating for an undesirable transfer characteristic in a television system.

Another object of the invention is to provide a novel method and means for controlling the gamma of the overall transfer characteristic of a color television system employing tandem television channels of the type mentioned above so as to minimize brightness distortion.

According to the invention, the video signals in each channel of a tandem television system of the type described above are reversed before being fed to the picture tube therein so that minimum and maximum signal values represent highlights and shadows, respectively. The negative images produced on the screens of the picture tubes in the three channels are scanned by the three camera tubes therein, respectively, which are operated on the linear parts of their transfer characteristics, as indicated above, and the signal outputs of the three camera tubes are reversed to restore them to the conventional form prior to being combined preparatory for transmission.

Assuming no net brightness distortion in the portions of the system other than the camera and picture tubes, the first camera tube introduces distortion in the form of compression of the highlights in the picture being televised; the first picture tube in each channel also compresses the highlights in the picture, in spite of the fact that the gamma of its transfer characteristic is greater than unity, because the video signal supplied to it has been reversed; the camera tube in each channel, which is operated on the linear part of its characteristic, introduces no substantial distortion; and the terminal color picture tube, responsive to the combined reversed signals from the camera tubes in the three channels produces considerably expansion of the highlights in the picture because the gamma of its transfer characteristic is considerably greater than one. The highlight expansion in the latter tube substantially compensates for the compression produced by the first camera tube and by the picture tubes in the three channels so that the transfer characteristic for the overall system has a gamma of substantially unity.

A fuller understanding of the invention may be had by reference to the following detailed description taken in conjunction with the accompanying figures of the drawing, in which.

Figure 1:
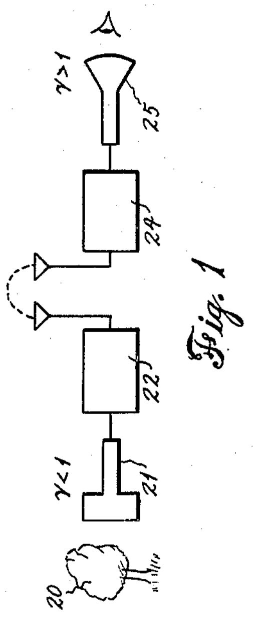
Fig. 1 is a block diagram of a conventional television system wherein the low-gradient transfer characteristic of the television camera is substantially compensated for by the high-gradient transfer characteristic of the picture tube in the home receiver.

It may be helpful first to consider briefly how an overall transfer characteristic of unity gamma may be achieved in a conventional black and white television system having a camera tube and a picture tube at the opposite terminals thereof. Such a system is shown in Fig. 1, in which an object 20 is adapted to be scanned by a conventional scanning tube 21, such as an iconoscope or image orthicon, for example. The video signal thus produced is then operated on by conventional television transmitter circuits 22 and transmitted in any suitable manner to conventional receiving circuits 24 which control the operation of a suitable picture tube or kinescope 25.

Figure 2:
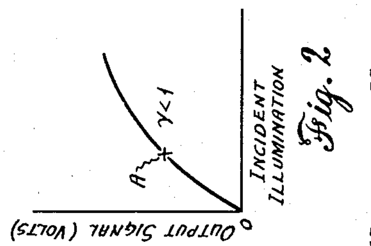
Fig. 2 is a graphical representation of the transfer characteristic of a typical television camera tube.
Figure 6:
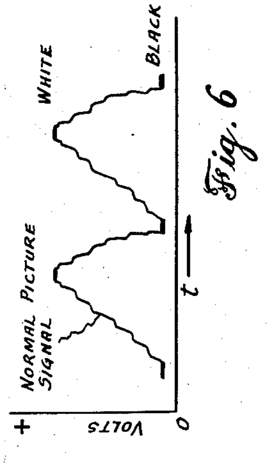
Fig. 6 is a graphical representation of a normal television picture signal.

A typical transfer characteristic for the scanning tube 21 is shown in Fig. 2. The curve rises in a substantially linear manner from the O or black level to the point A after which the slope starts to decrease in the manner of a saturation curve, thereby indicating compression of the higher voltage output signals, which are in the white area of the picture signal (Fig. 6).

Figure 4:
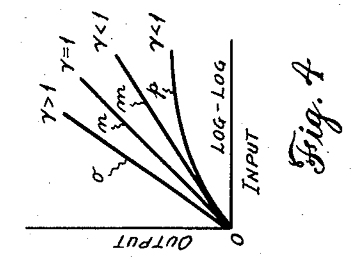
Fig. 4 is a graphical representation of typical transfer characteristics plotted on log-log coordinates.

Since the impression of contrast between black and white for light received by the human eye varies as an exponential function instead of as a direct function, a plot of this transfer characteristic on log-log coordinates is more accurately descriptive of the amount of visual distortion indicated by the transfer characteristic. As previously mentioned, when the transfer characteristic plotted on log-log coordinates is linear (e. g., the curves $m$, $n$ and $o$ in Fig. 4), it is indicative of uniform brightness distortion. An example of nonuniform brightness distortion is shown by the curve $p$ of Fig. 4. The linear characteristic curve $m$ corresponds to the transfer characteristic of Fig. 2 and has a slope less than unity ($\gamma<1$). The linear curve $n$ has a slope of 45° or unity, representing a distortionless transfer characteristic.

Figure 3:
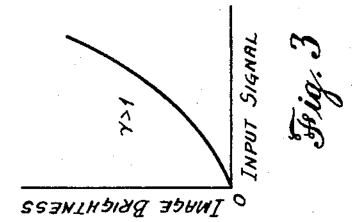
Fig. 3 is a graphical representation of a transfer characteristic of a typical television picture tube or kinescope.

A typical transfer characteristic for the picture tube 25 is shown in Fig. 3 and it rises in an exponential manner, indicating compression of the low voltage input signals corresponding to dark areas of the picture and expansion of the higher voltage input signals corresponding to the light areas. Plotted on log-log coordinates, this transfer characteristic would appear as the linear curve $o$ in Fig. 4, making an angle greater than 45° with the horizontal axis ($\gamma>1$). It will be apparent from an inspection of Fig. 4 that if the transfer characteristic $m$ of the scanning tube 21 is displaced from the curve $n$ by an amount substantially equal to the angular displacement of the transfer characteristic $o$ for the picture tube 25 from the curve $n$, the resultant overall transfer characteristic will approximate the curve $n$ ($\gamma=1$).

Therefore, assuming that no brightness distortion is introduced by the transmitter circuits 22 and receiving circuits 24, the low-gradient transfer characteristic ($\gamma<1$) of the scanning tube 21 will be substantially compensated for under ordinary operating conditions by the high-gradient transfer characteristic ($\gamma>1$) of the picture tube 25. Thus, the image which is presented to the viewer on the face of the picture tube 25 is substantially distortionless, i. e., the contrast range between black and white of the image is substantially the same as that of the object 20, thereby providing realism.

Figure 5:
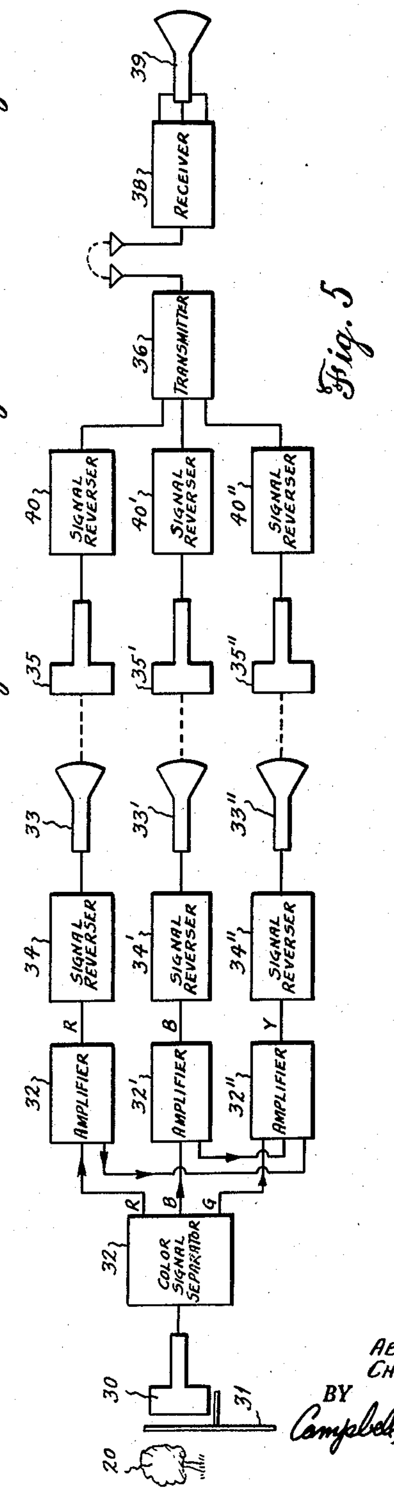
Fig. 5 is a block diagram of a color television system embodying exemplary tandem television channels constructed according to the invention.

Fig. 5 illustrates a color television system of the type disclosed in the above-mentioned application Serial No. 375,219, having a plurality of tandem type television channels in which gamma control means according to the invention may be effectively incorporated. As shown in the figure, an object 20 is adapted to be scanned in a field sequential manner by a conventional monochrome camera tube 30. Interposed between the object 20 and the tube 30 is a color wheel 31, which may be of the type shown in Patent No. 2,304,081, for example, rotatable in synchronism with the field scansion rate which may be 180 fields a second, for example. The signals from the picture tube 30, representing sequentially red, blue and green color separations of the object 20, are separated by color separator means 32 and fed sequentially to three separate channels, designated R, B and G. The R and B signals are fed through conventional amplifiers 32 and 32′ to the R and B channels.

The G signal is combined with proper amounts of the R and B signals to form white and the combined signal is fed through the amplifier 32″ to the Y channel. The R, B and Y channels are essentially alike and it will be necessary, therefore, to describe only the R channel, corresponding parts in the B and Y channels being designated by like prime and double prime reference characters.

The video signal from the amplifier 32 is fed to a conventional picture tube 33 on the face of which is reproduced a black and white image representing a red color separation of the object 20, as disclosed in greater detail in the aforementioned application. The picture tube 33 is maintained synchronized with the camera tube 30 as to scanning pattern and rate of scan by suitable means (not shown).

The image formed on the face of the picture tube 33 is adapted to be scanned by a second camera tube 35 operated only in the linear portion of its transfer characteristic, e. g., the portion O to A in Fig. 2. The scanning pattern and rate of scan for the camera tube may be the usual interlaced scanning at 60 fields per second, maintained by conventional means (not shown). Preferably, the scanning lines in the camera tube 35 are at an angle to the scanning lines on the face of the picture tube 33.

The video signal outputs from the camera tubes 35, 35′ and 35″ are fed to transmission means 36, disclosed in greater detail in the aforementioned copending application, which transmits a radio signal to receiver means 38 including a color picture tube 39.

For the sake of simplicity, it will be assumed that compensation has been made for any brightness distortion introduced by system components other than the camera tubes 30, 35, 35′ and 35″ and the picture tubes 33, 33′, 33″ and 39. As stated, the black and white picture tubes 33, 33′ and 33″ have transfer characteristics of gamma greater than unity, i. e., brightness values corresponding to input signal variations at small signal amplitudes are relatively compressed, whereas brightness values corresponding to input signal variations at large signal amplitudes are expanded; the gamma of the color picture tube transfer characteristic is also greater than unity but it is considerably greater than the gammas for the black and white tubes; the camera tube 30 has a transfer characteristic of gamma less than unity so that the highlights in the object 20 are compressed; and the camera tubes 35, 35′ and 35″ operate under conditions of unity gamma so that they introduce no substantial brightness distortion. Hence, the transfer characteristic for the overall system is considerably greater than unity, i. e., the shadow areas of the picture are compresed, while the highlights are expanded.

Figure 7:
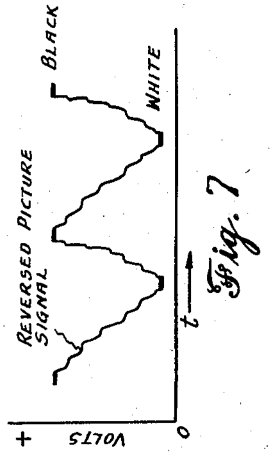
Fig. 7 is a graphical representation of the reversed picture signal produced in each of the three channels of Fig. 5.

The gamma of the overall transfer characteristic of a television system of the type shown in Fig. 5 is brought substantially to unity, according to the invention, by introducing signal polarity reversing means 34, 34′ and 34″ in each of the channels to reverse the video signal inputs to the picture tubes 33, 33′ and 33″. Suitable signal polarity reversing means may comprise, for example, a single stage linear amplifier. As shown in Fig. 7, when the video signal is reversed, minimum and maximum values represent white and black, respectively. Accordingly, the picture tubes 33, 33' and 33", which have gammas greater than unity, will compress the highlights in the picture and expand the shadows. In other words, each of these tubes will behave as if it had a gamma less than one. As a result, the gammas of the camera tube 30 and of the picture tubes 33, 33' and 33", all of which are now less than unity, will substantially compensate for the gamma of the color picture tube which is considerably greater than unity. The overall system will then have a gamma of substantially unity.

In order to restore the video signal to its usual form, illustrated in Fig. 6, suitable polarity reversing means 40, 40' and 40" should be interposed between the camera tubes 35, 35' and 35", respectively, and the transmitter means 36. Single stage linear amplifiers might be used for this purpose.

Thus there has been provided, in accordance with the invention, novel and improved means for controlling in a simple and highly effective manner the overall gamma of a color television system of the type utilizing tandem television channels.

Optimum gamma control action according to the invention may be achieved in tandem television systems of the type described above which utilize camera tubes having no substantial shading characteristics such as the cathode potential stabilized orthicon, for example.

It will be obvious to those skilled in the art that the above-disclosed exemplary embodiment is susceptible of modification and variation without departing from the spirit and scope of the invention. For example, the gamma control means may be embodied in other television systems including other forms of the system of Fig. 5 which are disclosed in the aforementioned copending application Serial No. 375,219, for example. Therefore, the invention is not to be limited to the specific embodiment disclosed but is to be considered as broadly as the scope of the appended claims will allow.

We claim:

1. In a television system having an overall transfer characteristic of given gamma other than unity, the combination of a first scanning tube for scanning an object to produce a first picture signal, picture tube means having a transfer characteristic of given gamma other than unity in the same sense as that of the overall transfer characteristic of the system for producing an image determined by said picture signal, means interposed between said scanning tube and said picture tube for reversing the polarity of opposite extreme amplitudes of said first picture signal so as to cause the opposite extremes of light and dark in the image to be inversely representative of the opposite extremes of light and dark in the picture represented thereby, a second scanning tube for scanning said image to produce a second picture signal, and means for reversing the polarity of the opposite extreme amplitudes of said second picture signal to give it the same form as said first picture signal before reversal of the polarity thereof.

2. In a television system having an overall transfer characteristic of a gamma other than unity, the combination of a first scanning tube for scanning an object to produce a first picture signal first, picture tube having a transfer characteristic of given gamma other than unity in the same sense as the gamma of the overall transfer characteristic of said system, means for producing an image determined by said picture signal, means interposed between said first scanning tube and said first picture tube for reversing the polarity of the opposite extreme amplitudes of said first picture signal to cause the opposite extremes of light and dark in the image produced by said first picture tube to be inversely representative of the opposite extremes of light and dark in the picture represented thereby, a second scanning tube for scanning said image to produce a second picture signal, means for reversing the polarity of the opposite extreme amplitudes of said second picture signal, and second picture tube means responsive to a function of said second signal after reversal of the polarity thereof.

3. In a color television system having an overall transfer characteristic of gamma other than unity, the combination of first scanning tube means for scanning a color separation of an object to produce a first picture signal having opposite extreme amplitudes which represent opposite extremes of light and dark in the picture represented thereby, picture tube means having a transfer characteristic of given gamma other than unity in the same sense as the gamma of the overall transfer characteristic of the system for producing an image determined by said picture signal, means interposed between said first scanning tube means and said picture tube means for reversing the polarity of opposite extreme amplitudes of said first picture signal to cause the opposite extremes of light and dark in said image to be inversely representative of the opposite extremes of light and dark in the picture represented thereby, second scanning tube means for scanning said image to produce a second picture signal, means for reversing the polarity of the opposite extreme amplitudes of said second picture signal, and color picture tube means responsive to a function of said second signal after reversal of the polarity thereof.

4. In a color television system having an overall transfer characteristic of gamma other than unity, the combination of first scanning tube means for scanning different color separations of an object sequentially to produce first picture signals having opposite extreme amplitudes which represent opposite extremes of light and dark in the picture represented thereby, a plurality of picture tube means each having transfer characteristics of gamma other than unity in the same sense as the gamma of the overall transfer characteristic of said system for producing a plurality of images determined by said picture signals, means inserted between said first scanning tube means and each of said picture tube means for reversing the polarities of the opposite extreme amplitudes of signals applied to the latter to cause said respective images to have opposite extremes of light and dark inversely representative of corresponding opposite extremes of light and dark in the picture represented thereby, a plurality of second scanning tube means for scanning said respective images to produce second picture signals corresponding thereto, color picture tube means responsive to a combination of said second picture signals, and means interposed between each of said second scanning tube means and said color picture tube means for reversing the polarities of the opposite extreme amplitudes of said second picture signals.

References Cited in the file of this patent

UNITED STATES PATENTS 2,545,957 Kell ---------------- Mar. 20, 1951

UNITED STATES PATENT OFFICE

CERTIFICATE OF CORRECTION

Patent No. 2,845,479 July 29, 1958

Abraham Goldberg et al.

It is hereby certified that error appears in the printed specification of the above numbered patent requiring correction and that the said Letters Patent should read as corrected below.

Column 2, line 52, for "considerably" read -- considerable --; column 5, line 63, after "tube" insert -- means --; line 66, after "system" strike out ", means"; column 6, line 49, after "of", second occurrence, insert -- the --.

Signed and sealed this 21st day of October 1958.

(SEAL)
Attest:

KARL H. AXLINE
Attesting Officer

ROBERT C. WATSON
Commissioner of Patents